US012200315B2

(12) United States Patent
Zhang et al.

(10) Patent No.: US 12,200,315 B2
(45) Date of Patent: Jan. 14, 2025

(54) VIDEO STREAM TRANSMISSION CONTROL METHOD AND APPARATUS, DEVICE, AND MEDIUM

(71) Applicant: ZHEJIANG UNIVIEW TECHNOLOGIES CO., LTD., Zhejiang (CN)

(72) Inventors: Qiang Zhang, Zhejiang (CN); Jun Chen, Zhejiang (CN); Hao Xu, Zhejiang (CN)

(73) Assignee: ZHEJIANG UNIVIEW TECHNOLOGIES CO., LTD., Zhejiang (CN)

( * ) Notice: Subject to any disclaimer, the term of this patent is extended or adjusted under 35 U.S.C. 154(b) by 227 days.

(21) Appl. No.: 17/913,316

(22) PCT Filed: Oct. 13, 2020

(86) PCT No.: PCT/CN2020/120545
§ 371 (c)(1),
(2) Date: Sep. 21, 2022

(87) PCT Pub. No.: WO2021/189815
PCT Pub. Date: Sep. 30, 2021

(65) Prior Publication Data
US 2023/0125350 A1  Apr. 27, 2023

(30) Foreign Application Priority Data
Mar. 26, 2020  (CN) .......................... 202010222330.0

(51) Int. Cl.
*H04N 21/658* (2011.01)
*H04N 21/647* (2011.01)
(52) U.S. Cl.
CPC ... *H04N 21/6582* (2013.01); *H04N 21/64769* (2013.01)

(58) Field of Classification Search
None
See application file for complete search history.

(56) References Cited

U.S. PATENT DOCUMENTS

| 8,477,846 B2 | 7/2013 | Vadapalli et al. |
| 11,089,386 B1 * | 8/2021 | Bernstein ........... H04N 21/8547 |

(Continued)

FOREIGN PATENT DOCUMENTS

| CN | 1956508 A | 5/2007 |
| CN | 101540709 A | 9/2009 |

(Continued)

OTHER PUBLICATIONS

International Search Report in Application No. PCT/CN2020/120545, dated Dec. 30, 2020, 6 pages including English Translation.

(Continued)

*Primary Examiner* — Omar S Parra
(74) *Attorney, Agent, or Firm* — Morgan, Lewis & Bockius LLP

(57) ABSTRACT

A video stream transmission control method includes that: in response to detecting that a receiving time interval of two adjacent received video frames in multiple received video frames is less than an interval threshold, theoretical receiving time of a next video frame sent by a video stream sending device corresponding to the each received video frame is determined; multiple theoretical receiving times corresponding to the multiple video stream sending devices are sorted, and expected receiving time of a next video frame sent by each video stream sending device of the multiple video stream sending devices is determined according to a sorting result and interval adjustment time; and the video frame sending time interval of the each video stream sending (Continued)

device is adjusted according to the expected receiving time and the theoretical receiving time corresponding to the each video stream sending device.

16 Claims, 3 Drawing Sheets

(56) References Cited

U.S. PATENT DOCUMENTS

| | | |
|---|---|---|
| 2009/0178096 A1 | 7/2009 | Menn et al. |
| 2010/0178036 A1 | 7/2010 | Heinmiller et al. |
| 2011/0080952 A1 | 4/2011 | Vadapalli et al. |
| 2012/0314759 A1 | 12/2012 | Huang et al. |
| 2015/0312651 A1 | 10/2015 | Zhuang et al. |
| 2017/0264866 A1 | 9/2017 | Li et al. |

FOREIGN PATENT DOCUMENTS

| | | |
|---|---|---|
| CN | 101599965 A | 12/2009 |
| CN | 102739511 A | 10/2012 |
| CN | 103795950 A | 5/2014 |
| CN | 104754339 A | 7/2015 |
| CN | 104918133 A | 9/2015 |
| CN | 105049783 A | 11/2015 |
| CN | 106488265 A | 3/2017 |
| CN | 106791910 A | 5/2017 |
| CN | 107231328 A | 10/2017 |
| CN | 10475433 B | 2/2018 |
| CN | 104754339 B | 2/2018 |
| WO | WO2017/181893 A1 | 10/2017 |
| WO | WO2018/226232 A1 | 12/2018 |

OTHER PUBLICATIONS

Extended European Search Report in Application No. 20926669.1, dated Apr. 18, 2024, 8 pages.

* cited by examiner

VIDEO STREAM TRANSMISSION CONTROL METHOD AND APPARATUS, DEVICE, AND MEDIUM

CROSS REFERENCE TO RELATED APPLICATIONS

The present application is a national stage application filed under 35 U.S.C. 371 based on International Patent Application No. PCT/CN2020/120545, filed on Oct. 13, 2020, which claims priority to Chinese Patent Application No. 202010222330.0, filed with the China National Intellectual Property Administration (CNIPA) on Mar. 26, 2020, the disclosures of which are incorporated herein by reference in their entireties.

TECHNICAL FIELD

The present disclosure relates to the field of video stream technologies, and for example, a video stream transmission control method and apparatus, a device, and a medium.

BACKGROUND

In a video coding, a size of a key frame is typically much greater than those of other video frames. For conventional internet protocol camera (IPC) video streams, the key frames are sent to a network video recorder (NVR) at a fixed time interval. In a video monitoring networking, in a case where one NVR matches with multiple IPCs and requests multiple IPC video streams at the same time, time for the key frame of each IPC to reach the NVR cannot be determined by the NVR, so that multiple IPCs may simultaneously send the key frames to the NVR in a time period, and thus a code stream burst may be caused.

Due to the limitation of a bandwidth, key frames of part of the IPCs can be sent to the NVR after being delayed for a long time due to the code stream burst, so that the real-time performance of monitoring pictures cannot be guaranteed.

SUMMARY

The present disclosure provides a video stream transmission control method and apparatus, a device, and a medium to solve a problem that monitoring pictures of some IPCs are poor in the real-time performance when multiple IPCs send key frames to a network video recorder (NVR) at the same time.

A video stream transmission control method is provided. The method includes: in response to detecting that a receiving time interval of two adjacent received video frames in multiple received video frames is less than an interval threshold, determining, according to receiving time of each received video frame of the multiple received video frames and video frame sending time interval of a video stream sending device corresponding to the received video frame in multiple video stream sending devices, theoretical receiving time of a next video frame sent by the video stream sending device corresponding to the received video frame; sorting multiple theoretical receiving times corresponding to the multiple video stream sending devices, and determining, according to a sorting result and interval adjustment time, expected receiving time of a next video frame sent by each video stream sending device of the multiple video stream sending devices; and adjusting, according to the expected receiving time and the theoretical receiving time corresponding to the each video stream sending device, the video frame sending time interval of the each video stream sending device.

A video stream transmission control apparatus is further provided. The apparatus includes a theoretical receiving time determination module, an expected receiving time determination module, and a sending time interval adjustment module.

The theoretical receiving time determination module is configured to, in response to detecting that a receiving time interval of two adjacent received video frames in multiple received video frames is less than an interval threshold, determine, according to receiving time of each received video frame of the multiple received video frames and video frame sending time interval of a video stream sending device corresponding to the each received video frame in multiple video stream sending devices, theoretical receiving time of a next video frame sent by the video stream sending device corresponding to the each received video frame.

The expected receiving time determination module is configured to sort multiple theoretical receiving times corresponding to the multiple video stream sending devices, and determine, according to a sorting result and interval adjustment time, expected receiving time of a next video frame sent by each video stream sending device of the multiple video stream sending devices.

The sending time interval adjustment module is configured to adjust, according to the expected receiving time and the theoretical receiving time corresponding to the each video stream sending device, the video frame sending time interval of the each video stream sending device.

A device is further provided. The device includes one or more processors and a storage apparatus. The storage apparatus is configured to store one or more programs. The one or more programs, when executed by the one or more processors, cause the one or more processors to implement the video stream transmission control method described above.

A computer-readable medium is further provided. The computer-readable medium stores a computer program, and the computer program, when executed by a processor, implements the video stream transmission control method described above.

DETAILED DESCRIPTION

Embodiments of the present disclosure will be described in conjunction with the accompanying drawings and embodiments below.

In some video application scenarios, such as real-time monitoring, network live broadcast, and online examination, the real-time performance of a video picture is one of the most important factors influencing the user experience. In a video stream processing process, a video stream sending device typically sends I-frames, i.e., key frames, in a video stream to a video stream receiving device, so that the video stream receiving device performs a video stream processing according to the I-frames. In an actual application scenario, one video stream receiving device is generally associated with multiple video stream sending devices, such as, in a multi-angle monitoring scenario. Because the I-frames contain a lot of image information and occupies a large bandwidth during a transmission, when a lot of video stream sending devices send the I-frames to the video stream receiving device at the same time within a short period of time, considering that the network bandwidth is limited, some of the I-frames are always in a state to be processed, and the network bandwidth is processed by the video stream receiving device until the network bandwidth meets the condition, so that the video pictures corresponding to these I-frames are displayed with lag.

Embodiment One

Figure 1:
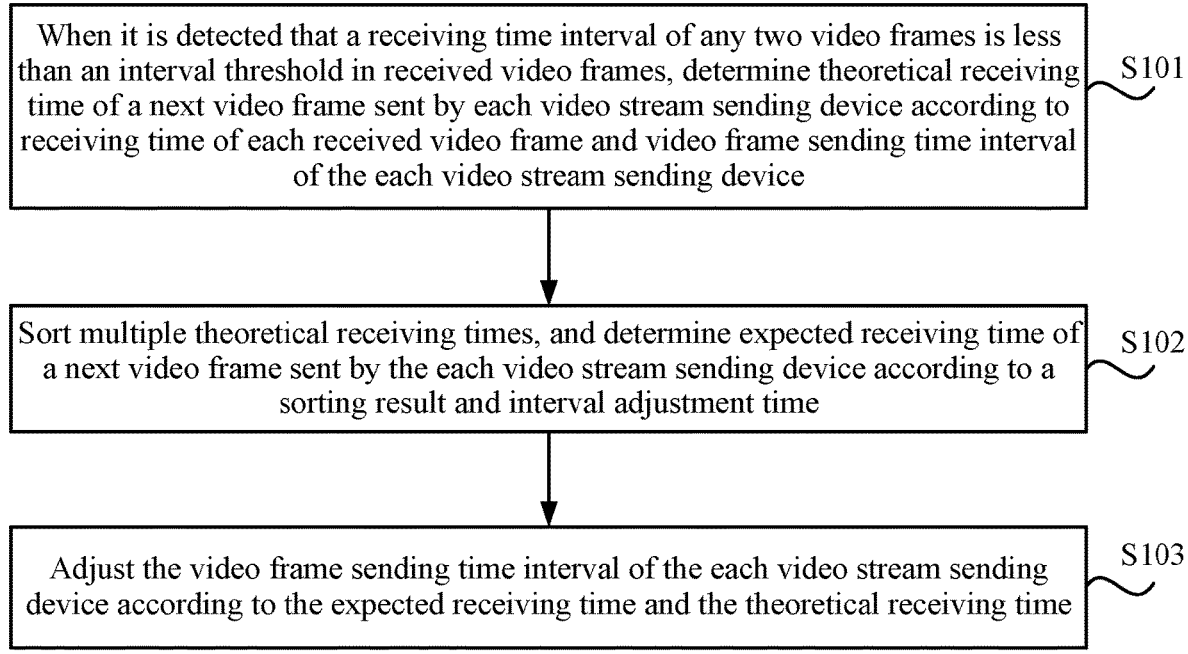
FIG. 1 is a flowchart of a video stream transmission control method provided in an embodiment one of the present disclosure.

FIG. 1 is a flowchart of a video stream transmission control method provided in an embodiment one of the present disclosure. This embodiment is applicable to a case that an IPC sends a video key frame to an NVR, and the method may be performed by the video stream transmission control apparatus provided in the embodiments of the present disclosure, and the video stream transmission control apparatus may be implemented in a manner of software and/or hardware. As shown in FIG. 1, the method may include the following.

In step 101, when it is detected that a receiving time interval of any two video frames in received video frames is less than an interval threshold, theoretical receiving time of a next video frame sent by each video stream sending device is determined according to receiving time of each received video frame and video frame sending time interval of the each video stream sending device.

The video stream sending device means a device that generates and transmits a video stream, the video stream is composed of video frames from frame to frame, and optionally, the video stream sending device includes, but is not limited to, an IPC, i.e., a web camera that generates a digital video stream and transmits the video stream over a wired or wireless network, such as a networked monitoring camera. After the video stream is generated by the video stream sending device, the video stream is sent to a video stream receiving device, and the video stream receiving device represents a device for receiving and processing the video stream and optionally includes, but not limited to, the NVR, i.e., a network video recorder used for performing a video parameter selection, a video coding, a video frame rendering and the like on video stream data after receiving the video stream. The interval threshold is used for determining whether the time interval between any two adjacent received video frames received by the video stream receiving device is too short or not, and the interval threshold may be determined by a preset calculation rule according to actual requirements. The video frame sending time interval represents time interval of two adjacent frames among the video frames sent by any video stream sending device to the video stream receiving device.

When the video stream receiving device receives any video frame, the receiving time of the video frame is recorded. The video stream receiving device detects receiving time intervals of all received video frames according to a predetermined period, optionally including 10 minutes. If response to detecting that a receiving time interval of at least any two video frames is less than a predetermined interval threshold, then it is indicated that a receiving time interval between currently received video frames is too small, and thus the real-time performance of a generation of a video picture is affected. Further, the theoretical receiving time of the next video frame sent by the each video stream sending device is determined according to recorded receiving time of the received video frame and predetermined video frame sending time interval of each video stream sending device. The theoretical receiving time represents time when the video stream receiving device receives the next video frame sent by the each video stream sending device in a case where sending time of each video stream sending device is not adjusted.

Exemplarily, it is assumed that the interval threshold is 3 seconds, if receiving time of the received video frames is IPC1: 5 minutes 0 seconds, IPC2: 5 minutes 4 seconds, IPC3: 5 minutes 5 seconds, IPC4: 5 minutes 9 seconds, and IPC5: 5 minutes 15 seconds, respectively, where IPC1, IPC2, IPC3, IPC4, and IPC5 represent the video stream sending device to which the video frames corresponds, respectively. Because an receiving time interval of video frames corresponding to the IPC2 and the IPC3 is 1 second, 1 second<3 seconds, the video stream receiving device determines the theoretical receiving time of the next video frame sent by each video stream sending device according to a preset calculation rule, such as multiplication or addition, according to the receiving time of each received video frame and the video frame sending time interval of each video stream sending device.

The theoretical receiving time of the next video frame sent by each video stream sending device is determined. As a result, a foundation is laid for subsequently adjusting the video frame sending time interval of each video stream sending device according to the theoretical receiving time.

In step 102, multiple theoretical receiving times are sorted, and expected receiving time of a next video frame sent by the each video stream sending device is determined according to a sorting result and interval adjustment time.

Sorting the theoretical receiving times includes, but is not limited to, sorting the theoretical receiving times in an ascending order according to a time sequence, or sorting the theoretical receiving times in a descending order according to a time sequence. The interval adjustment time represents time for adjusting the theoretical receiving time of each video stream sending device.

The theoretical receiving times are sorted according to a preset sorting manner to obtain a sorting result, corresponding target theoretical receiving time is selected for sorting results obtained according to different sorting manners, for example, earliest theoretical receiving time is selected as the target theoretical receiving time if the ascending order is performed according to the time sequence, and for another example, latest theoretical receiving time is selected as the target theoretical receiving time if the descending order is performed according to the time sequence, and further the interval adjustment time is added to the target theoretical receiving time, and the expected receiving time of the next video frame sent by each video stream sending device is obtained in sequence according to the sorting result. The expected receiving time is an expected value obtained by adjusting the theoretical receiving time of the next video frame sent by each video stream sending device.

The expected receiving time of the next video frame sent by each video stream sending device is determined. A foundation is laid for subsequently adjusting the video frame sending time interval of each video stream sending device according to the expected receiving time.

In step 103, the video frame sending time interval of the each video stream sending device is adjusted according to the expected receiving time and the theoretical receiving time.

The video stream receiving device calculates the time adjustment value of the video stream sending device according to the expected receiving time and the theoretical receiving time of the next video frame sent by each video stream sending device, and feeds the time adjustment value back to the video stream sending device; therefore, the video frame sending time interval of the video stream sending device is adjusted.

The video frame sending time interval of each video stream sending device is adjusted according to the expected receiving time and the theoretical receiving time, so that a problem of overlarge bandwidth occupation caused by simultaneous sending of the video frames of the video stream sending devices is avoided, and thus the real-time performance of video pictures is ensured.

According to the technical scheme provided in the embodiments of the present disclosure, the theoretical receiving time and the expected receiving time of the next video frame sent by each video stream sending device are determined, and the video frame sending time interval of the video stream sending device is adjusted according to the theoretical receiving time and the expected receiving time, so that a problem of overlarge bandwidth occupation caused by simultaneous sending of the video frames of the video stream sending devices is avoided, and thus the real-time performance of video pictures is ensured.

Based on the above embodiments, before the step 101, the method further includes that: the interval adjustment time and the interval threshold are determined according to the video frame sending time interval of the each video stream sending device.

After the video stream sending device is connected to the video stream receiving device, the video stream receiving device initiates a video stream request, and meanwhile, a video frame information statistics module in the video stream receiving device accesses the video stream sending device, and acquires the video frame sending time interval of the video stream sending device through an open network video interface forum (ONVIF) protocol, and further, the video stream receiving device obtains the interval adjustment time according to a preset algorithm according to the video frame sending time interval of each video stream sending device, and determines the interval threshold according to a proportional relation between a preset interval adjustment time and the interval threshold.

Optionally, that the interval adjustment time and the interval threshold are determined according to the video frame sending time interval of the each video stream sending device includes following two steps A and B.

A, a greatest common divisor of multiple video frame sending time intervals is determined, and the interval adjustment time is determined according to a number of video stream sending devices and the greatest common divisor.

A ratio of the greatest common divisor to the number of video stream sending devices is taken as the interval adjustment time. When any video stream sending device has a stream establishment, a stream disconnection and a change in the video frame sending time interval, the video stream receiving device may redetermine the interval adjusting time.

Exemplarily, it is assumed that the video stream receiving device is connected with n video stream sending devices, and the video frame sending time interval is T1, T2, T3 . . . Tn, respectively, then a greatest common divisor Ta of n values is calculated, the greatest common divisor Ta is divided to n equal parts to obtain a value Ta/n, and finally Ta/n is taken as the interval adjustment time.

B, the interval adjustment time is divided by a preset constant to obtain the interval threshold.

The preset constant may be set according to actual requirements.

Exemplarily, it is assumed that the interval adjustment time is Ta/n and the preset constant is k, then the value Ta/kn obtained through dividing the interval adjustment time by the preset constant is taken as the interval threshold.

A data foundation is laid for subsequently determining the theoretical receiving time and the expected receiving time of the next video frame sent by each video stream sending device through determining the interval adjustment time and the interval threshold according to the video frame sending time interval of the each video stream sending device.

Embodiment Two

Figure 2:
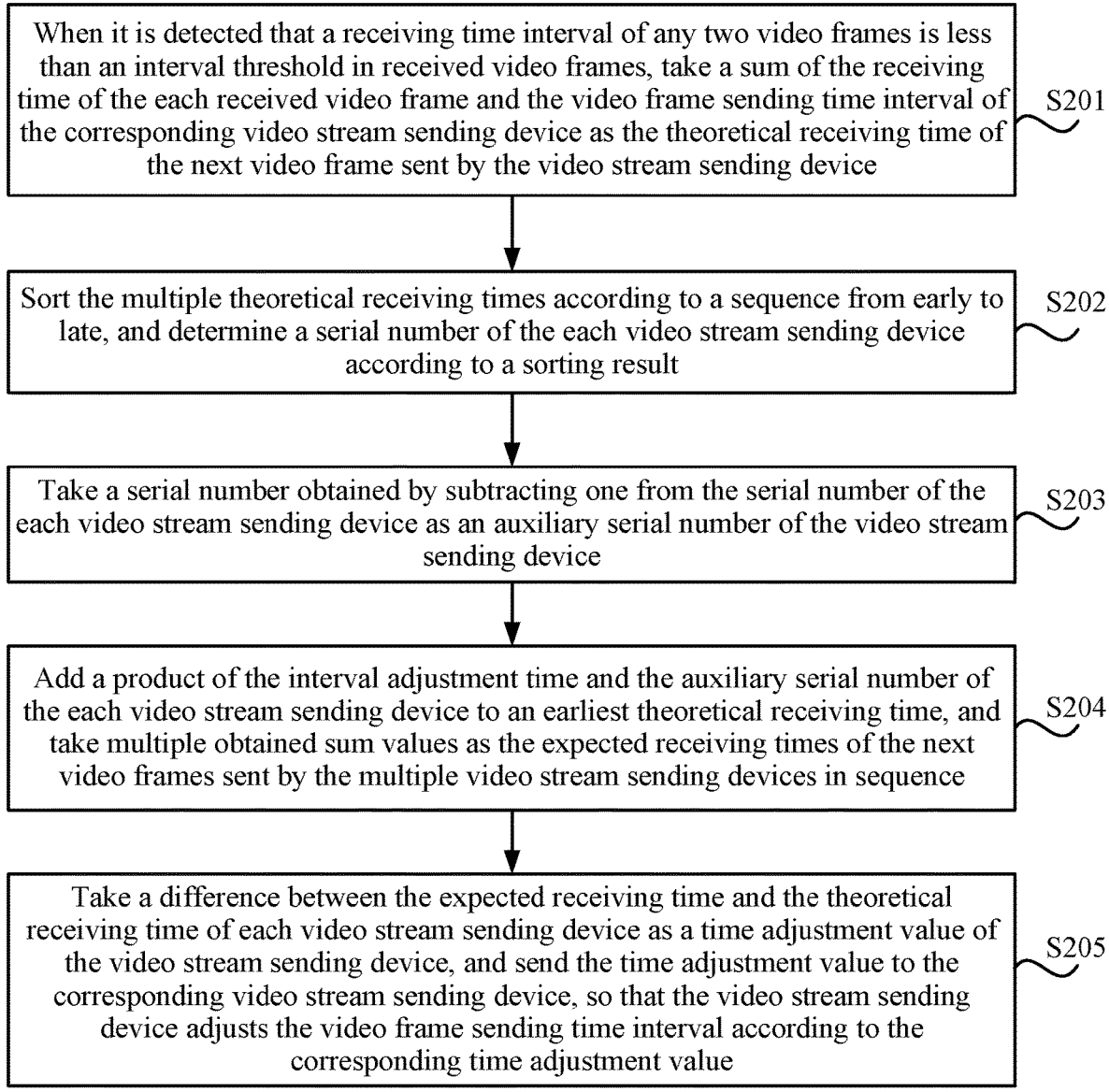
FIG. 2 is a flowchart of a video stream transmission control method provided in an embodiment two of the present disclosure.

FIG. 2 is a flowchart of a video stream transmission control method provided in an embodiment two of the present disclosure. This embodiment is illustrated on the basis of the optional embodiment described above, as shown in FIG. 2, the method may include the following.

In step 201, when it is detected that a receiving time interval of any two video frames is less than an interval threshold in received video frames, a sum of the receiving time of the each received video frame and the video frame sending time interval of the corresponding video stream sending device is taken as the theoretical receiving time of the next video frame sent by the video stream sending device.

Exemplarily, it is assumed that the video stream receiving device receives n video frames, the receiving time is m1, m2, m3, . . . , mn, respectively, the video stream sending devices corresponding to the n video frames are IPC1, IPC2, . . . , IPCn, respectively, and the corresponding video frame sending time interval is t1, t2, t3, . . . , tn, theoretical receiving time of a next video frame sent by the IPC1 is m1+t1, theoretical receiving time of a next video frame sent by the IPC2 is m2+t2, . . . , theoretical receiving time of a next video frame sent by the IPCn is mn+tn.

In step 202, the multiple theoretical receiving times are sorted according to a sequence from early to late, and a serial number of the each video stream sending device is determined according to a sorting result.

Exemplarily, it is assumed that the theoretical receiving time of the next video frame corresponding to the video stream sending devices IPC1, IPC2, IPC3, IPC4 and IPC5 is t1, t2, t3, t4 and t5, respectively, and the sorting result of the theoretical receiving time according to the sequence from early to late is t2, t3, t1, t5 and t4, then serial numbers of the IPC1, IPC2, IPC3, IPC4 and IPC5 are determined to be 3, 1, 2, 5 and 4, respectively according to the video stream sending device corresponding to the theoretical receiving time.

In step 203, a serial number obtained by subtracting one from the serial number of the each video stream sending device is taken as an auxiliary serial number of the video stream sending device.

Exemplarily, it is assumed that the serial numbers of the video stream sending devices IPC1, IPC2, IPC3, IPC4, and IPC5 are 3, 1, 2, 5, and 4, respectively, then auxiliary serial numbers of the IPC1, IPC2, IPC3, IPC4 and IPC5 obtained by subtracting one from all serial numbers are 2, 0, 1, 4 and 3, respectively.

In step 204, a product of the interval adjustment time and the auxiliary serial number of the each video stream sending device is added to an earliest theoretical receiving time, and multiple obtained sum values are taken as the expected receiving times of the next video frames sent by the multiple video stream sending devices in sequence.

Exemplarily, it is assumed that a sorting result of the theoretical receiving time of the next video frame sent by the video stream sending device according to a sequence from early to late is IPC2, IPC3, IPC1, IPC5 and IPC4, the theoretical receiving time of the next video frame sent by the IPC2 is t2 earliest, the interval adjustment time is Ta/n, and the auxiliary serial numbers of the IPC1, IPC2, IPC3, IPC4, and IPC5 are 2, 0, 1, 4, and 3, respectively, and the expected receiving time of the next video frame sent by the IPC2, the IPC3, the IPC1, the IPC5 and the IPC4 is t2+0*Ta/n, t2+1*Ta/n, t2+2*Ta/n, t2+3*Ta/n, and t2+4*Ta/n, respectively.

In step 205, a difference between the expected receiving time and the theoretical receiving time of each video stream sending device is taken as a time adjustment value of the video stream sending device, and the time adjustment value is sent to the corresponding video stream sending device, so that the video stream sending device adjusts the video frame sending time interval according to the corresponding time adjustment value.

A form of the time adjustment value includes a positive number, a negative number and zero, and when the time adjustment value is the positive number, the video stream sending device may prolong the video frame sending time interval according to the time adjustment value; when the time adjustment value is the negative number, the video stream sending device may shorten the video frame sending time interval according to the time adjustment value; and when the time adjustment value is zero, the video stream sending device keeps the current video frame sending time interval unchanged.

Exemplarily, it is assumed that the theoretical receiving time and the expected receiving time of the next video frame sent by the video stream sending device IPC1 are T2 and T1, respectively, then (T1−T2) is taken as the time adjustment value of IPC1. If T1<T2, then the IPC1 shortens the current video frame sending time interval by −(T1−T2); if T1>T2, then the IPC1 prolongs the current video frame sending time interval by (T1−T2); and if T1=T2, then the IPC1 keeps the current video frame sending time interval unchanged.

After each video stream sending device completes adjustment of the video frame sending time interval, subsequent video frames are sent according to the adjusted video frame sending time interval, and if the video stream receiving device detects that the receiving time interval of any two video frames is less than the interval threshold in the subsequently received video frames, then the steps 201 to 205 of the embodiments of the present disclosure are continued to be performed. According to the technical scheme provided in the embodiments of the present disclosure, the theoretical receiving times are sorted according to the sequence from early to late, the sequence number of each video stream sending device is determined according to the sorting result, and the serial number obtained by subtracting one from the serial number of the each video stream sending device is taken as the auxiliary serial number of the video stream sending device, and further, the product of the interval adjustment time and the auxiliary serial number of the each video stream sending device is added to an earliest theoretical receiving time, and the multiple obtained sum values are taken as the expected receiving times of the next video frames sent by the multiple video stream sending devices in sequence, and finally the difference between the expected receiving time and the theoretical receiving time of each video stream sending device is taken as the time adjustment value of the video stream sending device, and the time adjustment value is sent to the corresponding video stream sending device, so that the video stream sending device adjusts the video frame sending time interval, whereby a problem of overlarge bandwidth occupation caused by simultaneous sending of the video frames of the video stream sending devices is avoided, and thus the real-time performance of video pictures is ensured.

Embodiment Three

Figure 3:
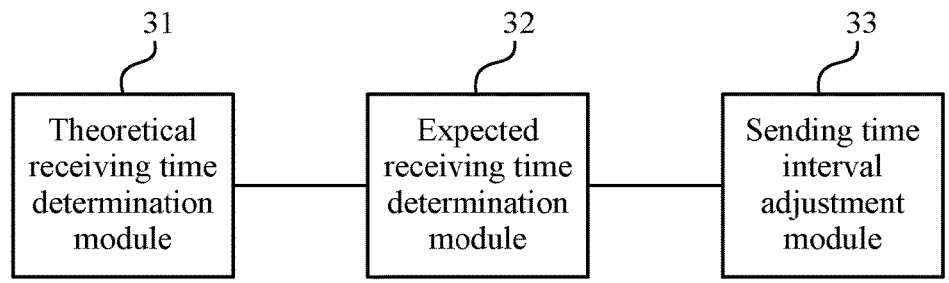
FIG. 3 is a schematic structural diagram of a video stream transmission control apparatus provided in an embodiment three of the present disclosure.

FIG. 3 is a schematic structural diagram of a video stream transmission control apparatus provided in an embodiment three of the present disclosure, the video stream transmission control apparatus may perform the video stream transmission control method provided in any one of the embodiments of the present disclosure, and have function modules and beneficial effects corresponding to the execution method. As shown in FIG. 3, the apparatus may include a theoretical receiving time determination module 31, an expected receiving time determination module 32, and a sending time interval adjustment module 33. The theoretical receiving time determination module 31 is configured to, when it is detected that a receiving time interval of any two video frames is less than an interval threshold in received video frames, determine, according to receiving time of each received video frame and video frame sending time interval of the each video stream sending device, theoretical receiving time of a next video frame sent by each video stream sending device. The expected receiving time determination module 32 is configured to sort multiple theoretical receiving times, and determine, according to a sorting result and interval adjustment time, expected receiving time of a next video frame sent by the each video stream sending device. The sending time interval adjustment module 33 is configured to adjust, according to the expected receiving time and the theoretical receiving time, the video frame sending time interval of the each video stream sending device.

Based on the above embodiments, the apparatus further includes a time information acquisition module. The time information acquisition module is configured to determine the interval adjustment time and the interval threshold according to the video frame sending time interval of the each video stream sending device.

Based on the above embodiments, the time information acquisition module is configured to: determine a greatest common divisor of multiple video frame sending time intervals, and determine the interval adjustment time according to a number of video stream sending devices and the greatest common divisor; and divide the interval adjustment time by a preset constant to obtain the interval threshold.

Based on the above embodiments, the theoretical receiving time determination module 31 is configured to take a sum of the receiving time of the each received video frame and the video frame sending time interval of the video stream sending device corresponding to the each received video frame as the theoretical receiving time of the next video frame sent by the video stream sending device corresponding to the each received video frame.

Based on the above embodiments, the expected receiving time determination module 32 is configured to: the multiple theoretical receiving times are sorted according to a sequence from early to late, and a serial number of the each video stream sending device is determined according to a sorting result; take a serial number obtained by subtracting one from the serial number of the each video stream sending device as an auxiliary serial number of the each video stream sending device; and add a product of the interval adjustment time and the auxiliary serial number of the each video stream sending device to an earliest theoretical receiving time among the multiple theoretical receiving times, and take multiple obtained sum values as the expected receiving times of the next video frames sent by the multiple video stream sending devices in sequence.

Based on the above embodiments, the sending time interval adjustment module 33 is configured to: take a difference between the expected receiving time and the theoretical receiving time of the each video stream sending device as a time adjustment value of the each video stream sending device; and send the time adjustment value to the corresponding video stream sending device, so that the video stream sending device adjusts the video frame sending time interval according to the corresponding time adjustment value.

The video stream transmission control apparatus provided in the embodiments of the present disclosure may perform the video stream transmission control method provided in any one of the embodiments of the present disclosure, and has function modules and effects corresponding to the execution method. Technical details not described in detail in this embodiment may be referred to the video stream transmission control method provided in any one of the embodiments of the present disclosure.

Embodiment Four

Figure 4:
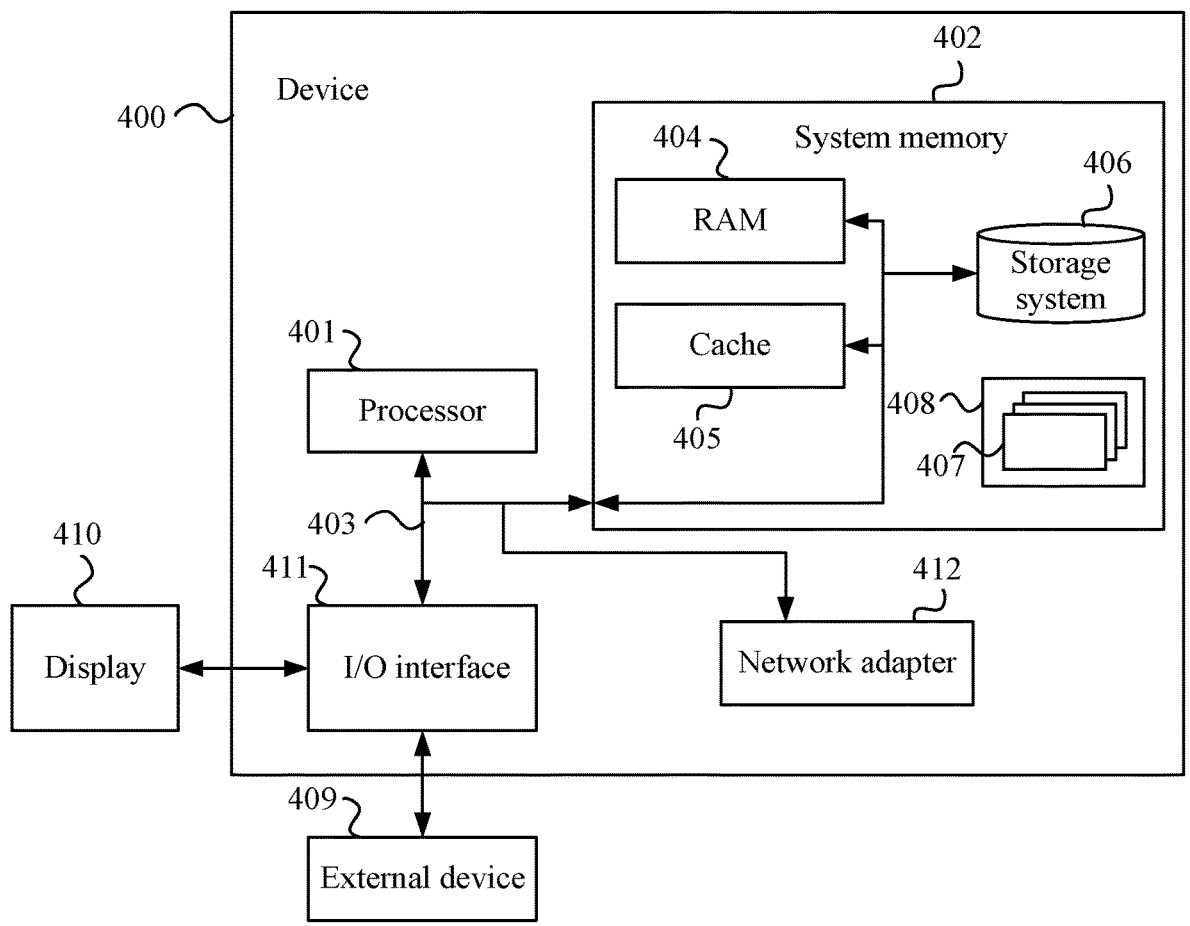
FIG. 4 is a schematic structural diagram of a device provided in an embodiment four of the present disclosure.

FIG. 4 is a schematic structural diagram of a device provided in an embodiment four of the present disclosure. FIG. 4 shows a block diagram of an exemplary device 400 suitable for use in implementing embodiments of the present disclosure. The device 400 shown in FIG. 4 is merely an example and should not impose any limitations on the functionality or the scope of use of the embodiments of the present disclosure.

As shown in FIG. 4, the device 400 is represented in a form of a general purpose computing device. Components of the device 400 may include, but are not limited to, one or more processors or processing units 401, a system memory 402, and a bus 403 that connects various system components (including the system memory 402 and the processing unit 401).

The bus 403 represents one or more of several types of bus structures, including a memory bus or memory controller, a peripheral bus, an accelerated graphics port, and a processor, or a local bus using any of a variety of bus structures. By way of example, these architectures include, but are not limited to, an industry standard architecture (ISA) bus, a micro channel architecture (MAC) bus, an enhanced ISA bus, a video electronics standards association (VESA) local bus, and a peripheral component interconnect (PCI) bus.

The device 400 includes a variety of computer system readable media. Such media may be any available media that may be accessed by the device 400, and includes both volatile and nonvolatile media, and removable and non-removable media.

The system memory 402 may include a computer system readable medium in a form of a volatile memory, such as a random access memory (RAM) 404 and/or a cache memory 405. The device 400 may include other removable/non-removable, volatile/nonvolatile computer system storage media. By way of example only, the storage system 406 may be configured to read from and write to a non-removable, nonvolatile magnetic medium (not shown in FIG. 4, commonly referred to as a "hard drive"). Although not shown in FIG. 4, a magnetic disk drive configured to read from and write to a removable, non-volatile magnetic disk (such as, a "floppy disk"), and an optical disk drive configured to read from and write to a removable, non-volatile optical disk (such as, a compact disc-read only memory (CD-ROM), a digital video disc-ROM (DVD-ROM), or other optical media) may be provided. In such instances, each drive may be connected to the bus 403 through one or more data media interfaces. The memory 402 may include at least one program product having a set (such as, at least one) of program modules, and these program modules are configured to perform functions of the embodiments of the present disclosure.

A program/utility 408 having a set (at least one) of program modules 407 may be stored, for example, in the memory 402, such program modules 407 include, but not limited to, an operating system, one or more application programs, other program modules, and program data, each or a combination of these examples may include implementations of a network environment. The program modules 407 generally perform the functions and/or methodologies in the embodiments of the present disclosure.

The device 400 may also communicate with one or more external devices 409 (e.g., a keyboard, a pointing device, display 410, etc.), one or more devices that enable a user to interact with the device 400, and/or any devices (such as, a network card, a modem) that enable the device 400 to communicate with one or more other computing devices. Such communication may occur via an input/output (I/O) interface 411. Moreover, the device 400 may also communicate with one or more networks (such as a local area network (LAN), a wide area network (WAN), and/or a public network, such as the Internet) through a network adapter 412. As shown, the network adapter 412 communicates with other modules of the device 400 via the bus 403. It should be appreciated that although not shown in the drawings, other hardware and/or software modules may be used in connection with the device 400, including, but not limited to, a microcode, a device drive, a redundant processing unit, an external disk drive array, a redundant array of independent disk (RAID) system, a tape drive, and a data backup storage system, and the like.

The processing unit 401 executes multiple functional applications and data processing by running a program stored in the system memory 402, for example, to implement the video stream transmission control method provided in the embodiments of the present disclosure, and the method includes that: when it is detected that a receiving time interval of any two video frames is less than an interval threshold in received video frames, theoretical receiving time of a next video frame sent by each video stream sending device is determined according to receiving time of each received video frame and video frame sending time interval of the each video stream sending device; multiple theoretical receiving times are sorted, and expected receiving time of a next video frame sent by the each video stream sending device is determined according to a sorting result and interval adjustment time; and the video frame sending time interval of the each video stream sending device is adjusted according to the expected receiving time and the theoretical receiving time.

Embodiment Five

An embodiment five of the present disclosure further provides a computer-readable storage medium, and a computer-executable instruction is configured to perform, when executed by a computer processor, a video stream transmission control method. The method includes that: when it is detected that a receiving time interval of any two video frames is less than an interval threshold in received video frames, theoretical receiving time of a next video frame sent by each video stream sending device is determined according to receiving time of each received video frame and video frame sending time interval of the each video stream sending device; multiple theoretical receiving times are sorted, and expected receiving time of a next video frame sent by the each video stream sending device is determined according to a sorting result and interval adjustment time; and the video frame sending time interval of the each video stream sending device is adjusted according to the expected receiving time and the theoretical receiving time.

In a storage medium including the computer-executable instruction provided in an embodiment of the present disclosure, the computer-executable instruction is not limited to the operation of the method described above, but may also perform related operations in the video stream transmission control method provided in any of the embodiments of the present disclosure. The computer-readable storage medium of the embodiments of the present disclosure may adopt any combination of one or more computer-readable media. The computer-readable medium may be a computer-readable signal medium or a computer-readable storage medium. The computer-readable storage medium may be, for example, but not limited to, an electronic, magnetic, optical, electromagnetic, infrared, or semiconductor system, apparatus, or device, or any combination of the foregoing. Examples (a non-exhaustive list) of the computer-readable storage medium include: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In this context, the computer-readable storage medium may be any tangible medium that contains or stores a program for use by or in connection with an instruction execution system, an apparatus, or a device.

The computer-readable signal medium may include a propagated data signal with a computer-readable program code carried therein, for example, in a baseband or as part of a carrier wave. Such a propagated data signal may adopt a variety of forms, including, but not limited to: an electromagnetic signal, an optical signal, or any suitable combination of the foregoing. The computer-readable signal medium may be any computer-readable medium that is not a computer-readable storage medium and that may transmit, propagate, or transport a program for use by or in connection with an instruction execution system, an apparatus, or a device.

The program code contained on the computer-readable medium may be transmitted using any appropriate medium, including but not limited to: wireless, wire, optic cable, radio frequency (RF), etc., or any suitable combination of the foregoing.

A computer program code for performing the operations of the present disclosure may be written in one or more programming languages or combinations thereof, the described programming languages include an object-oriented programming language—such as Java, Smalltalk, C++, and further include a conventional procedural programming language—such as a "C" language or similar programming language. The program code may be executed in following manners: executed entirely on a user's computer, executed partly on the user's computer, executed as an independent software package, executed partly on the user's computer and partly on a remote computer, or executed entirely on the remote computer or a server. In a case where the remote computer is involved, the remote computer may be connected to the user's computer through any kind of network, including a local area network (LAN) or a wide area network (WAN), or may be connected to an external computer (for example, connected to the external computer through an internet provided by an internet service provider).

What is claimed is:

1. A video stream transmission control method, comprising:

in response to detecting that a receiving time interval of two adjacent received video frames in a plurality of received video frames is less than an interval threshold, determining, according to receiving time of each received video frame of the plurality of received video frames and video frame sending time interval of a video stream sending device corresponding to the each received video frame in a plurality of video stream sending devices, theoretical receiving time of a next video frame sent by the video stream sending device corresponding to the each received video frame;

sorting a plurality of theoretical receiving times corresponding to the plurality of video stream sending devices, and determining, according to a sorting result and interval adjustment time, expected receiving time of a next video frame sent by each video stream sending device of the plurality of video stream sending devices; and adjusting, according to the expected receiving time and the theoretical receiving time corresponding to the each video stream sending device, the video frame sending time interval of the each video stream sending device;

wherein before it is detected that the receiving time interval of the two adjacent received video frames is less than the interval threshold, the method further comprises:

determining the interval adjustment time and the interval threshold according to the video frame sending time interval of the each video stream sending device; and wherein determining the interval adjustment time and the interval threshold according to the video frame sending time interval of the each video stream sending device comprises:

determining a greatest common divisor of a plurality of video frame sending time intervals, and determining the interval adjustment time according to a number of video stream sending devices and the greatest common divisor; and dividing the interval adjustment time by a preset constant to obtain the interval threshold.

2. The method of claim 1, wherein determining, according to the receiving time of the each received video frame of the plurality of received video frames and the video frame sending time interval of the video stream sending device corresponding to the each received video frame in the plurality of video stream sending devices, the theoretical receiving time of the next video frame sent by the video stream sending device corresponding to the each received video frame comprises:
  taking a sum of the receiving time of the each received video frame and the video frame sending time interval of the video stream sending device corresponding to the each received video frame as the theoretical receiving time of the next video frame sent by the video stream sending device corresponding to the each received video frame.

3. The method of claim 2, wherein sorting the plurality of theoretical receiving times corresponding to the plurality of video stream sending devices, and determining, according to the sorting result and the interval adjustment time, the expected receiving time of the next video frame sent by the each video stream sending device of the plurality of video stream sending devices comprises:
  sorting, according to a sequence from early to late, the plurality of theoretical receiving times corresponding to the plurality of video stream sending devices, and determining, according to a sorting result, a serial number of the each video stream sending device;
  taking a serial number obtained by subtracting one from the serial number of the each video stream sending device as an auxiliary serial number of the each video stream sending device; and
  for the each video stream sending device, adding a product of the interval adjustment time and the auxiliary serial number of the each video stream sending device to an earliest theoretical receiving time among the plurality of theoretical receiving times, and taking an obtained sum value as the expected receiving time of the next video frame sent by the each video stream sending device.

4. The method of claim 1, wherein sorting the plurality of theoretical receiving times corresponding to the plurality of video stream sending devices, and determining, according to the sorting result and the interval adjustment time, the expected receiving time of the next video frame sent by the each video stream sending device of the plurality of video stream sending devices comprises:
  sorting, according to a sequence from early to late, the plurality of theoretical receiving times corresponding to the plurality of video stream sending devices, and determining, according to a sorting result, a serial number of the each video stream sending device;
  taking a serial number obtained by subtracting one from the serial number of the each video stream sending device as an auxiliary serial number of the each video stream sending device; and
  for the each video stream sending device, adding a product of the interval adjustment time and the auxiliary serial number of the each video stream sending device to an earliest theoretical receiving time among the plurality of theoretical receiving times, and taking an obtained sum value as the expected receiving time of the next video frame sent by the each video stream sending device.

5. The method of claim 4, wherein adjusting, according to the expected receiving time and the theoretical receiving time corresponding to the each video stream sending device, the video frame sending time interval of the each video stream sending device comprises:
  taking a difference between the expected receiving time and the theoretical receiving time corresponding to the each video stream sending device as a time adjustment value of the each video stream sending device; and
  sending the time adjustment value to the each video stream sending device, so that the each video stream sending device adjusts the video frame sending time interval according to the time adjustment value.

6. The method of claim 1, wherein adjusting, according to the expected receiving time and the theoretical receiving time corresponding to the each video stream sending device, the video frame sending time interval of the each video stream sending device comprises:
  taking a difference between the expected receiving time and the theoretical receiving time corresponding to the each video stream sending device as a time adjustment value of the each video stream sending device; and
  sending the time adjustment value to the each video stream sending device, so that the each video stream sending device adjusts the video frame sending time interval according to the time adjustment value.

7. The method of claim 6, wherein a form of the time adjustment value comprises a positive number, a negative number and zero;
  in a case where the time adjustment value is the positive number, prolonging, by the video stream sending device, the video frame sending time interval according to the time adjustment value; in a case where the time adjustment value is the negative number, shortening, by the video stream sending device, the video frame sending time interval according to the time adjustment value; in a case where the time adjustment value is zero, keeping, by the video stream sending device, the current video frame sending time interval unchanged.

8. The method of claim 1, wherein sorting the plurality of theoretical receiving times corresponding to the plurality of video stream sending devices, and determining, according to the sorting result and the interval adjustment time, the expected receiving time of the next video frame sent by the each video stream sending device of the plurality of video stream sending devices comprises:
  sorting the plurality of theoretical receiving times according to preset sorting manners to obtain the sorting results, and selecting corresponding target theoretical receiving time for sorting results obtained according to the preset sorting manners;
  adding the interval adjustment time to the target theoretical receiving time, and obtaining the expected receiving time of the next video frame sent by each video stream sending device in sequence according to the sorting results,
  wherein the expected receiving time is an expected value obtained by adjusting the theoretical receiving time of the next video frame sent by each video stream sending device.

9. The method of claim 8, wherein selecting the corresponding target theoretical receiving time for the sorting results obtained according to the preset sorting manners, comprises:
  selecting earliest theoretical receiving time as the target theoretical receiving time in a case where an ascending order is performed according to a time sequence; or
  selecting latest theoretical receiving time as the target theoretical receiving time in a case where a descending order is performed according to a time sequence.

10. The method of claim 1, wherein the theoretical receiving time represents time when the video stream receiving device receives the next video frame sent by the each video stream sending device in a case where sending time of each video stream sending device is not adjusted.

11. The method of claim 1, wherein the interval adjustment time represents time for adjusting the theoretical receiving time of the each video stream sending device.

12. A device, comprising:
   at least one processor;
   a storage apparatus, which is configured to store at least one program;
   wherein the at least one program, when executed by the at least one processor, causes the at least one processor to implement the following steps:
   in response to detecting that a receiving time interval of two adjacent received video frames in a plurality of received video frames is less than an interval threshold, determining, according to receiving time of each received video frame of the plurality of received video frames and video frame sending time interval of a video stream sending device corresponding to the each received video frame in a plurality of video stream sending devices, theoretical receiving time of a next video frame sent by the video stream sending device corresponding to the each received video frame;
   sorting a plurality of theoretical receiving times corresponding to the plurality of video stream sending devices, and determining, according to a sorting result and interval adjustment time, expected receiving time of a next video frame sent by each video stream sending device of the plurality of video stream sending devices; and
   adjusting, according to the expected receiving time and the theoretical receiving time corresponding to the each video stream sending device, the video frame sending time interval of the each video stream sending device;
   wherein the at least one program, when executed by the at least one processor, causes the at least one processor to implement, before it is detected that the receiving time interval of the two adjacent received video frames is less than the interval threshold, the following steps:
   determining the interval adjustment time and the interval threshold according to the video frame sending time interval of the each video stream sending device; and
   wherein determining the interval adjustment time and the interval threshold according to the video frame sending time interval of the each video stream sending device comprises:
   determining a greatest common divisor of a plurality of video frame sending time intervals, and determining the interval adjustment time according to a number of video stream sending devices and the greatest common divisor; and
   dividing the interval adjustment time by a preset constant to obtain the interval threshold.

13. The device of claim 12, wherein determining, according to the receiving time of the each received video frame of the plurality of received video frames and the video frame sending time interval of the video stream sending device corresponding to the each received video frame in the plurality of video stream sending devices, the theoretical receiving time of the next video frame sent by the video stream sending device corresponding to the each received video frame comprises:
   taking a sum of the receiving time of the each received video frame and the video frame sending time interval of the video stream sending device corresponding to the each received video frame as the theoretical receiving time of the next video frame sent by the video stream sending device corresponding to the each received video frame.

14. The device of claim 12, wherein sorting the plurality of theoretical receiving times corresponding to the plurality of video stream sending devices, and determining, according to the sorting result and the interval adjustment time, the expected receiving time of the next video frame sent by the each video stream sending device of the plurality of video stream sending devices comprises:
   sorting, according to a sequence from early to late, the plurality of theoretical receiving times corresponding to the plurality of video stream sending devices, and determining, according to a sorting result, a serial number of the each video stream sending device;
   taking a serial number obtained by subtracting one from the serial number of the each video stream sending device as an auxiliary serial number of the each video stream sending device; and
   for the each video stream sending device, adding a product of the interval adjustment time and the auxiliary serial number of the each video stream sending device to an earliest theoretical receiving time among the plurality of theoretical receiving times, and taking an obtained sum value as the expected receiving time of the next video frame sent by the each video stream sending device.

15. The device of claim 12, wherein adjusting, according to the expected receiving time and the theoretical receiving time corresponding to the each video stream sending device, the video frame sending time interval of the each video stream sending device comprises:
   taking a difference between the expected receiving time and the theoretical receiving time corresponding to the each video stream sending device as a time adjustment value of the each video stream sending device; and
   sending the time adjustment value to the each video stream sending device, so that the each video stream sending device adjusts the video frame sending time interval according to the time adjustment value.

16. A non-transitory computer-readable medium, storing a computer program, wherein the computer program, when executed by a processor, implements the following steps:
   in response to detecting that a receiving time interval of two adjacent received video frames in a plurality of received video frames is less than an interval threshold, determining, according to receiving time of each received video frame of the plurality of received video frames and video frame sending time interval of a video stream sending device corresponding to the each received video frame in a plurality of video stream sending devices, theoretical receiving time of a next video frame sent by the video stream sending device corresponding to the each received video frame;
   sorting a plurality of theoretical receiving times corresponding to the plurality of video stream sending devices, and determining, according to a sorting result and interval adjustment time, expected receiving time of a next video frame sent by each video stream sending device of the plurality of video stream sending devices; and
   adjusting, according to the expected receiving time and the theoretical receiving time corresponding to the each video stream sending device, the video frame sending time interval of the each video stream sending device;

wherein the computer program, when executed by a processor, before it is detected that the receiving time interval of the two adjacent received video frames is less than the interval threshold, implements the following steps:

determining the interval adjustment time and the interval threshold according to the video frame sending time interval of the each video stream sending device; and wherein determining the interval adjustment time and the interval threshold according to the video frame sending time interval of the each video stream sending device comprises:

determining a greatest common divisor of a plurality of video frame sending time intervals, and determining the interval adjustment time according to a number of video stream sending devices and the greatest common divisor; and dividing the interval adjustment time by a preset constant to obtain the interval threshold.

* * * * *